INVENTORS
ALFRED WALZ
ROBERT ÖSTREICHER

ATTORNEYS

INVENTORS
ALFRED WALZ
ROBERT ÖSTREICHER
BY
ATTORNEYS

INVENTORS
ALFRED WALZ
ROBERT ÖSTREICHER
BY
ATTORNEYS

Fig. 7
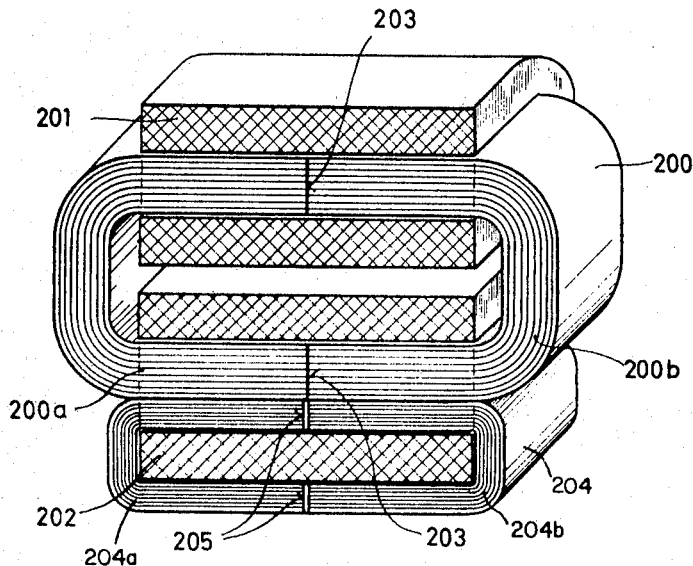
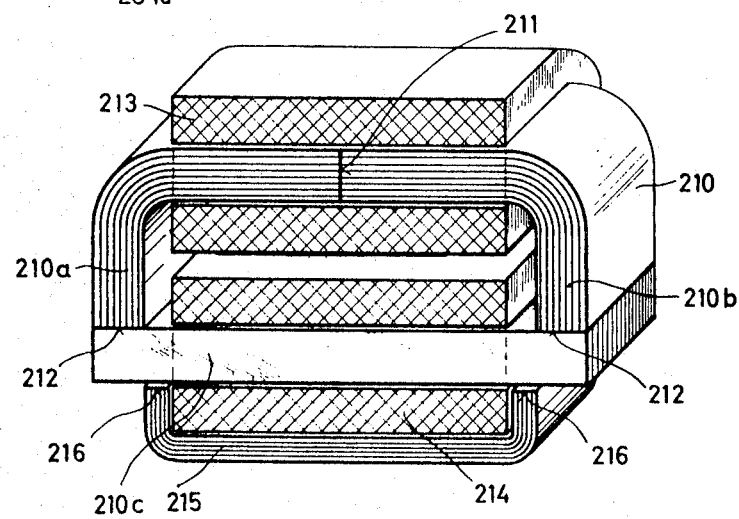
Fig. 8
INVENTORS
ALFRED WALZ
ROBERT STREICHER
BY
ATTORNEYS

INVENTOR.
ALFRED WALZ
BY ROBERT ÖSTREICHER

ATTORNEYS

United States Patent Office 3,454,868
Patented July 8, 1969

3,454,868
CONSTANT POTENTIAL TRANSFORMER
Alfred Walz, Emmendingen, Baden, and Robert Ostreicher, Teningen, Baden, Germany, assignors to FRAKO Kondensatoren- und Apparatebau G.m.b.H., Teningen, Baden, Germany
Original application Sept. 21, 1962, Ser. No. 225,282, now Patent No. 3,371,263, dated Feb. 27, 1968. Divided and this application Aug. 8, 1967, Ser. No. 667,310
Claims priority, application Germany, Sept. 21, 1961, F 34,969
Int. Cl. H02p *13/04;* H02m *5/12*
U.S. Cl. 323—60
7 Claims

ABSTRACT OF THE DISCLOSURE

A transformer, for use in a stabilised mains rectifying circuit arrangement for producing a substantially constant direct current output voltage which is independent of voltage fluctuations in the mains within the predetermined range, is disclosed as operating, under no-load conditions, in the magnetically supersaturated range. The transformer has a condenser connected in parallel with one winding, and has a leakage flux path between the primary and secondary windings, or else has a choke coil connected in series with the primary winding and saturated only on full load.

*Cross-reference to related application*

Figure 1:
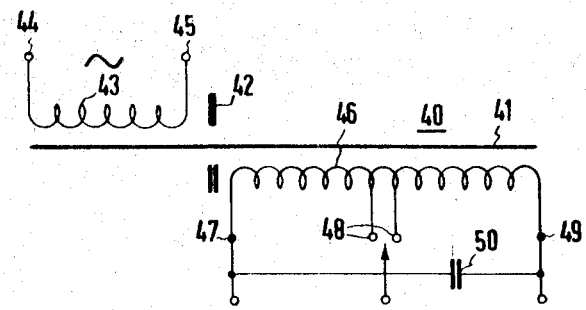

This application is a division of our co-pending application, Serial No. 225,282, filed Sept. 21, 1962, for "Stabilised Mains Rectifying Circuit Arrangement," now U.S. Patent No. 3,371,263.

*Background of the invention*

The invention relates to a stabilised mains rectifying circuit arrangement for producing a substantially constant output voltage, in particular a direct-current output voltage, which is independent of mains voltage fluctuations within a predetermined range of the direct output current, using a transformer operating under no-load conditions in the magnetically supersaturated range, with a condenser connected in parallel with one winding and with a leakage flux path between the primary and secondary windings or with a choke coil connected in series with the primary winding and saturated only on full load.

This is a circuit arrangement in which a resonant circuit tuned substantially to mains frequency and with supersaturated iron-core inductance is connected in series electrically with a substantially unsaturated iron-core inductance. Such circuit arrangements have the property of compensating the effecting of fluctuations of the mains voltage on the output voltage within wide limits. For example, they are suitable for supplying charging devices for storage batteries, in which case the charging characteristic may exhibit a section of constant current and a section of constant voltage.

One of the objects of the invention is to provide a circuit arrangement of the above-mentioned kind in which adjustment of the output characteristic can be effected with relatively simple means, in order to compensate for voltage drops occurring in the circuit and thereby also to make the output voltage substantially independent of load variations.

A further object of the invention is to provide for the circuit arrangement mentioned at the beginning a mains transformer which can be produced in simple manner with relatively small manufacturing tolerances and which supplies on its own account a substantially constant output voltage.

The mains rectifying circuit arrangement according to the invention is characterized in that a choke coil of variable inductance is provided in the alternating-current output circuit of the transformer and/or in the direct-current output circuit of the arrangement. In particular, when a transformer operating in the magnetically supersaturated range is employed with a choke coil connected in series with the primary winding and saturated only at full load, there may be provided for influencing the output characteristic, in addition to the choke coil arranged in the alternating-current and/or direct-current circuit of the transformer, a variable point of connection of the supply line to that winding of the transformer with which a condenser is connected in parallel. In this way, the output characteristic of the rectifying circuit arrangement can be varied within a certain range whereby, moreover, any manufacturing tolerances in the production of the mains transformer can be compensated. For this reason, the transformer and the circuit arrangement can be produced at lower cost.

In order to change the inductance, the winding of the choke coil located in the alternating-current or direct-current output circuit of the mains transformer can be bridged by a variable resistance. On the iron core of the choke coil located in the alternating-current or direct-current output circuit of the mains transformer there may also be provided a second winding, the ends of which are connected by way of a variable resistance. Preferably, the choke coil located in the direct-current circuit is designed in this way, the second winding being terminated by a rectifying bridge the direct-current output of which is fed to a parallel arrangement consisting of a condenser and a variable resistance. With this circuit arrangement a comparatively strong damping of the voltage and/or current fluctuations occurring in the direct-current circuit is obtained, which is particularly important where a circuit arrangement according to the invention is employed for supplying telephone exchanges, since in this case the arrangement is subjected to very marked and briefly occurring load fluctuations by the selector impulses.

The adjustment of at least one choke coil or the variation of the point of connection of the supply line to the transformer winding having a condenser connected in parallel therewith can be effected automatically in dependence upon an output quantity of the circuit arrangement. For example, the output voltage of the circuit arrangement can be employed for controlling an electronic regulating device which effects the adjustments or variations in known manner.

When a transformer is employed having a secondary winding connected with a condenser to form a resonance circuit and having a leakage path of increased magnetic resistance so arranged between the primary winding and the secondary winding that a part of the magnetic flux can permeate one of the windings to the exclusion of the other, the transformer core can be built up in manner known per se out of laminations with a preferred magnetic direction. In this case the laminations of that part of the transformer core which carries the main flux have the latter passing through them exclusively in the preferred magnetic direction and the laminations forming the magnetic leakage path are so arranged that the preferred magnetic direction and the magnetic leakage direction differ from one another. The magnetic leakage path may consist of at least one bundle of laminations, the preferred magnetic direction of which extends at right angles to its longitudinal direction, cut strip core halves carrying windings being attached substantially without any air gap on both sides of this bundle of laminations, namely on the end faces of the latter. Two cut strip core halves with a common bundle of laminations forming the leakage paths can be provided in each case for the primary winding and the secondary winding. However, it is also possible to associate separate bundles of laminations forming the leakage paths with the cut strip core halves.

The primary and secondary windings of the transformer may be arranged at a distance apart on a magnet core and be embraced by at least one E-shaped magnet yoke, the middle limb of which projects between the windings and forms an air gap with the magnet core. The primary and secondary windings may, however, also be arranged on the middle limb of a shell-type transformer core and magnet cores can be so inserted between the windings, namely in the gap between the middle limb and the outer limb, that air gaps are left between the limbs and cores.

Figure 2:
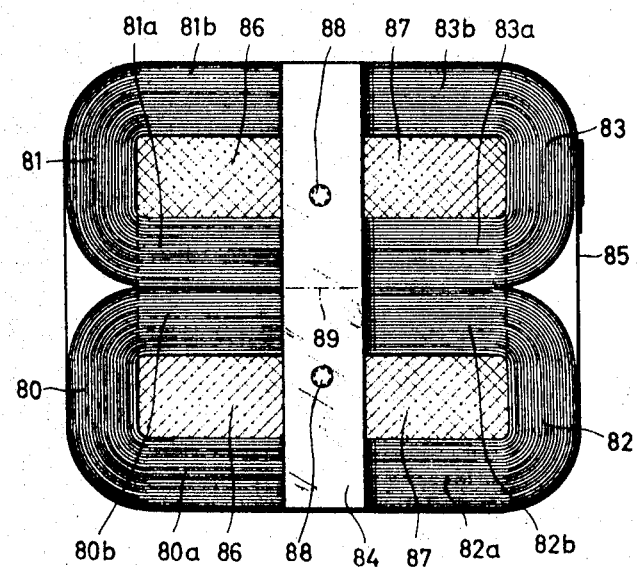
Figure 3:
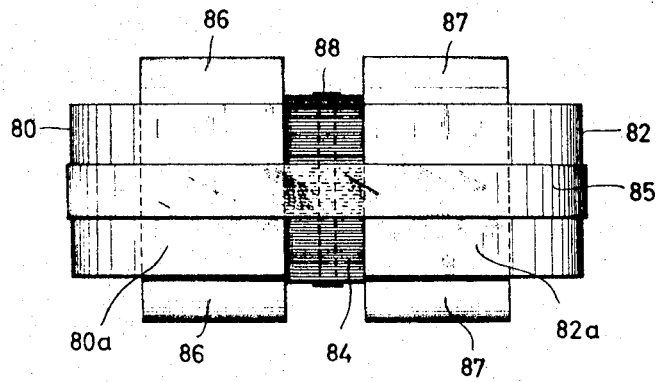
Figure 4:
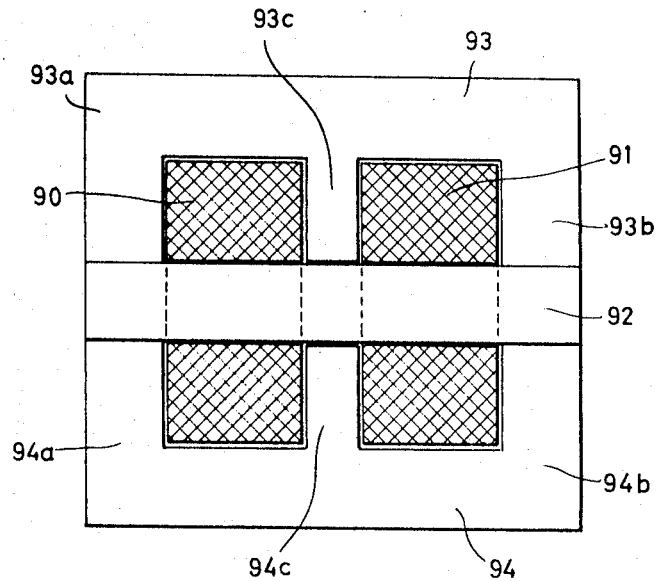
Figure 5:
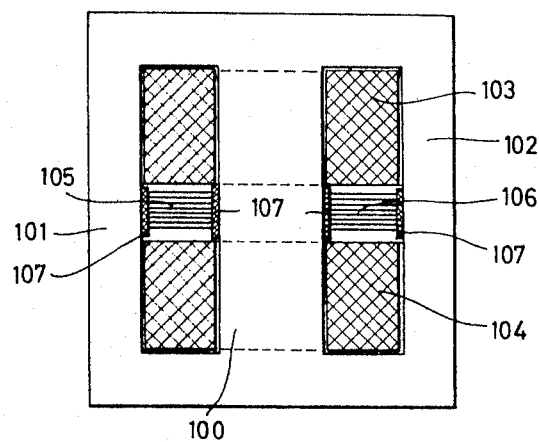
Figure 6:
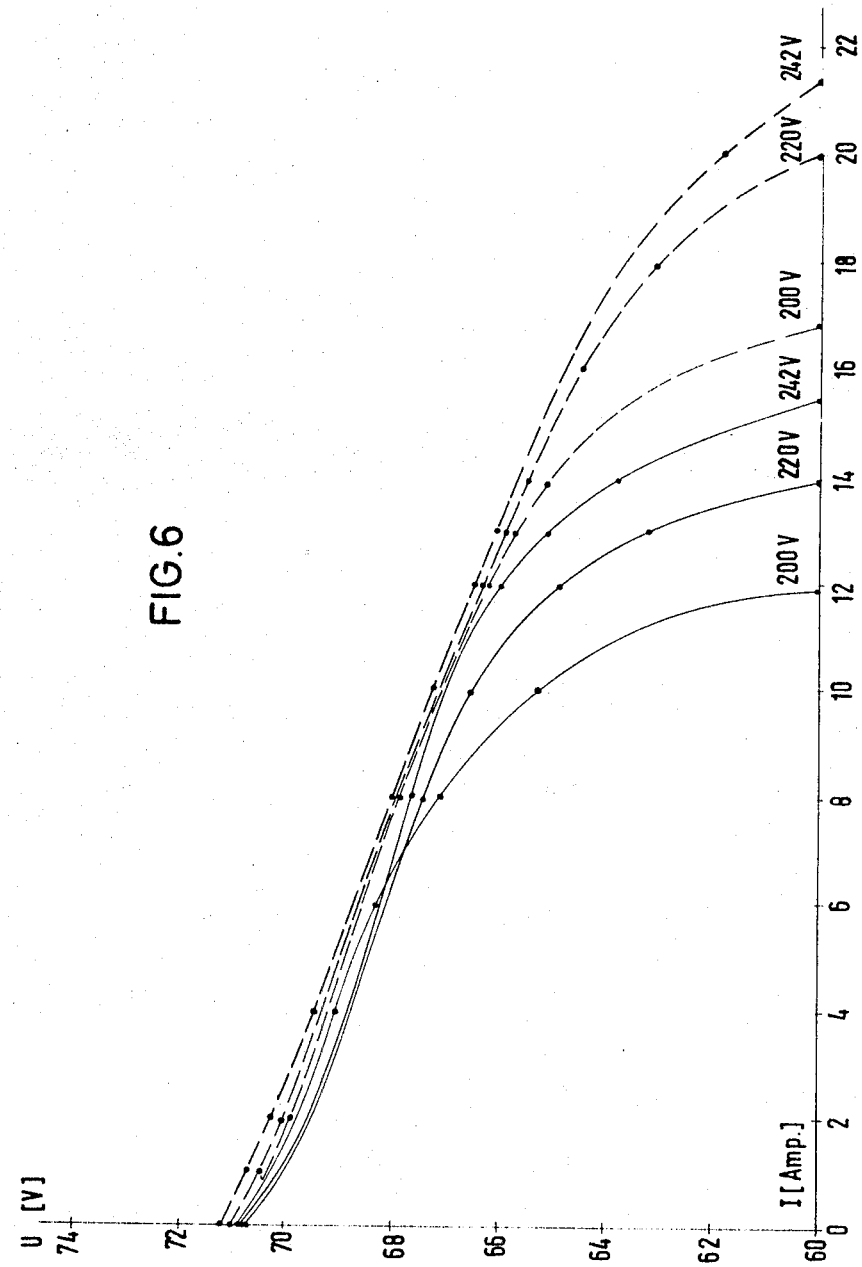

The invention is described more fully hereinafter with reference to the drawings which illustrate, by way of example a number of embodiments of the invention. In the drawings:

FIGURE 1 shows a circuit arrangement using a transformer with a leakage path between the primary and secondary windings, FIGURE 2 shows a constructional form of the transformer employed in the circuit arrangements according to FIG. 1, the winding being shown in section for greater clarity, FIGURE 3 is a side view of the transformer according to FIGURE 2, FIGURES 4 and 5 show two further constructional forms of the transformer according to FIGURES 2 and 3, using punched transformer laminations, the increased resistance of the magnetic leakage path being obtained by means of air gaps, FIGURE 6 is a graphic representation of the dependence of the output voltage of the transformer, FIGURES 7 to 9b show further constructional forms of a transformer with a leakage path.

In the circuit arrangement according to FIGURE 1 there is employed a special mains transformer 40 which contains a main core 41 and a magnetic leakage path 42. The reference 43 denotes a primary winding of the transformer with input terminals 44 and 45. The reference 46 denotes the transformer secondary winding with the terminals 47, 48 and 49. A condenser 50 is connected to the terminals 47 and 49 and forms a resonant circuit with the secondary winding 46.

By means of the magnetic leakage path 42, the magnetic flux in the transformer core is afforded the possibility of permeating one winding 43 or 46 to the exclusion of the other. In this way, the secondary voltage stabilised with the resonant circuit condenser 50 can substantially maintain its own energization by way of the leakage path 42 even in the event of fluctuations of the magnetic flux in the primary energizing winding. What is essential for such operation is that the magnetic resistance of the main iron path or circuit is smaller than the normal magnetic resistance of the leakage path. It has been found that a particularly good utilization of the magnetic material is possible when the transformer 40 is constructed with the aid of cut strip cores. In this case, not only is high efficiency of the circuit arrangement obtained, but the consumption of material required for the transformer can also be kept small.

FIGURES 2 and 3 show an example of construction of the mains transformers employed in the circuit arrangements of FIG. 1, the references 80 to 83 designating four cut strip core halves which are attached to the straight core part 84. The cut strip core halves 80 to 83 are produced in known manner. Magnetic sheet metal having a longitudinally extending preferred magnetic direction is wound, for example, on a mandrel and the individual layers of sheet metal are struck together by an annealing process and the coil produced in this way is divided in the middle. The magnetic flux flowing through the core halves consequently always permeates the individual sheets or laminations in the preferred magnetic direction.

A straight core part 84 consists of laminations stacked one above the other and likewise having a preferred magnetic direction. In fact, this preferred direction extends at right angles to the longitudinal direction of the core part 84. In this way there are obtained two magnetic circuits in contact with one another and having the following magnetic paths:

Limb 80a of the core part 80, core 84, limb 82a of the core part 82, limb 82b of the core part 82, core 84, limb 80b of the core part 80;

Limb 81a of the core part 81, core 84, limb 83a of the core part 83, limb 83b of the core part 83, core 84, limb 81b of the core part 81.

In both magnetic circuits the magnetic flux runs exclusively in the preferred magnetic direction of the various laminations.

A primary winding 86 of the transformer is mounted on the limbs 80b and 81a of the core parts 80 and 81, while the secondary winding 87 is mounted on the limbs 82b and 83a of the core parts 82 and 83. The individual core parts 80 to 83 are attached laterally to the core 84 in such manner that the end faces of the limbs bear against the end edges of the laminations forming the core 84. The individual laminations of the core 84 are held together by means of rivets 88 which, for example, may consist of brass. Between the end faces of the individual core limbs and the core 84 there is provided a thin electrically insulating layer which is intended to prevent the circulation of eddy currents. The entire arrangement is held together by means of a clamping strap 85.

The increased magnetic resistance of the magnetic core 84 in relation to the leakage flux is obtained due to the fact that the preferred magnetic direction of the individual sheets or laminations extends at right angles to the longitudinal direction of the core, while the leakage flux permeates the core in its longitudinal direction.

The core 84 may be divided along the line 89, that is in a magnetically neutral zone, without the magnetic properties being affected. In this way, however, a firm bearing action of the end faces of the individual core limbs is facilitated. The transformer shown in FIGURES 2 and 3 then consists of two similar parts. Instead of being made up of two parts, the transformer may naturally also be constructed out of only one core part, that is consisting say of the parts 80, 82, 84.

In the transformer core according to FIGURES 2 and 3, although an air gap is not necessary an increased magnetic resistance of the leakage flux path is obtained by the difference of the preferred magnetic direction of the core 84 from the direction of this magnetic leakage flux. As the core 84 can be produced with very accurately fixed properties and exact dimensions, adjustment of the magnetic circuit after assembly is, practically speaking, unnecessary. Firm holding together of the laminations forming the core 84 is ensured by means of rivets 88 which, for example, may consist of brass.

The core of the transformer may also be constructed as shown in FIGURE 4, in which a primary winding 90 and a secondary winding 91 are arranged on a core 92 at a distance from one another and are embraced by two E-shaped yoke parts 93 and 94. The yoke part 93 has the end faces of its limbs 93a and 93b and the yoke part 94 the end faces of its limbs 94a and 94b resting against the core 92. The magnetic leakage flux path is formed by the middle limb 93c and 94c between whose end faces and the core 92 air gaps are left which produce the increased reluctance of the leakage flux path.

The transformer may also be designed as shown in FIGURE 5. In this case, a shell-type core has a middle limb 100 and two outer limbs 101 and 102. A primary winding 103 and a secondary winding 104 are arranged at a distance from one another on the middle limb 100. In the gap between the primary winding 103 and the secondary winding 104, that is between the middle limb 100 and the outer limbs 101 and 102, there are arranged two magnet cores 105 and 106 composed of magnetic laminations. Between these cores 105 and 106 and the limbs of the transformer core there are provided magnetically non-conductive layers 107 by which magnetic air gaps are formed which produce the increased reluctance of the leakage flux path.

The transformers described with reference to FIGURES 2 to 5 are not confined to use in the circuit arrangements illustrated in FIG. 1. With these transformers by themselves an improvement of the constancy of the alternating-current output voltage is obtained without a rectifying bridge connected on the output side. Thus, the transformers described belong to the invention even without any rectifying bridge connected at the output side.

FIGURE 6 shows output characteristics of the transformer illustrated in FIGURES 2 and 3. The solid lines represent the characteristics of a known arrangement, while the characteristics of the transformer according to the invention are represented by broken lines. It will be apparent from the representation that, by means of the arrangement according to the invention, stabilization of the output voltage for a given load is possible in spite of fluctuating mains voltage with a comparatively small tolerance and this even with a comparatively high load. Moreover, tests have shown that in the construction according to the invention, the weight of the core of the transformer can be considerably reduced.

Further examples of embodiment of a transformer with a leakage path and for use with a condenser connected in parallel with one winding are shown in FIGURES 7 to 9b. In FIGURE 7, the reference 200 designates a main core of the transformer, which is preferably made of two cut strip core halves 200a and 200b carrying a primary winding 201 and a secondary winding 202. The cut strip core halves 200a and 200b are put together at the points 203 substantially without any air gap.

Laterally of the main core 200 there is attached a core 204 serving as leakage flux path and which embraces the secondary winding 202. The core 204 can likewise be made up from two cut strip core halves 204a and 204b, air gaps being however provided at the points 205 and producing the increased magnetic reluctance.

In FIGURE 8, the reference 210 designates a main core of another constructional example of the transformer. A core 210 consists of parts 210a, 210b and 210c which are assembled at the points 211 and 212 substantially without an air gap being formed. A primary winding 213 is arranged on the core parts 210a and 210b, while a secondary winding 214 is arranged on the straight core part 210c. Mounted laterally on this core part 210c is an additional core 215 which embraces the secondary winding 214 and forms the magnetic leakage flux path. In order to produce the increased magnetic reluctance, air gaps 216 are provided between the core part 210c and the core 215, these air gaps being maintained, for instance, by interposing magnetically non-conductive plates, while the separate core parts are pressed together, for example, by a clamping strap (not shown).

Figure 9A:
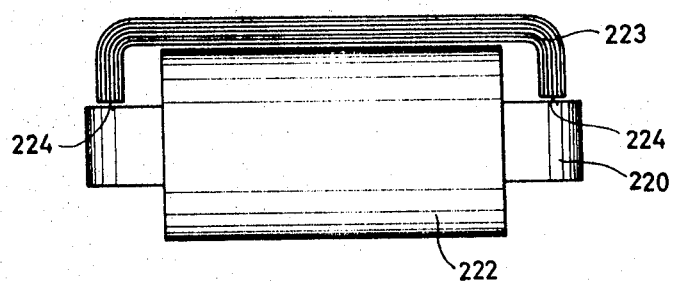
Figure 9B:
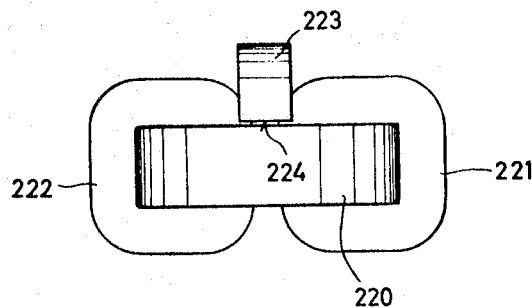

FIGURES 9a and 9b show a constructional form having a main core 220 which corresponds to the core 200 (FIGURE 7). This core 220 carries a primary winding 221 and a secondary winding 222. The magnetic leakage flux path is formed by the core 223, which is mounted here on the middle portions of the two U-shaped cut strip core parts, air gaps 224 being likewise left between the latter and the core 223.

When the transformers according to FIGURES 7 to 9b are employed, the circuit arrangement may be as shown in FIGURE 1, it being possible for any load to be connected to the terminals 47 and 48. Thus, voltage stabilisation also occurs with an alternating-current load. It should also be mentioned that instead of the load being connected to the terminals 47 and 48 of the winding 46 shown in FIGURE 1, it may also be connected to an additional winding coupled inductively with the winding 46.

We claim:
1. A constant potential transformer comprising, in combination, a core; a primary winding on said core and having a pair of A.C. input terminals; a secondary winding on said core; a condenser connected across said secondary winding to form therewith a parallel resonance circuit; a magnetic yoke member bridging said core between said primary and secondary windings and forming a stray flux path having a magnetic resistance greater than that of said core; said core and said yoke member comprising sheet metal laminations with magnetic preferential direction; the laminations of said core extending in superposed parallel relation throughout the entire length of said core and the magnetic preferential direction being continuously the same throughout the entire length of said core; the laminations forming said core being traversed by the magnetic flux in the magnetic preferential direction; the laminations forming said yoke member being traversed by the magnetic stray flux in a direction differing from the magnetic preferential direction.

2. A constant potential transformer, as claimed in claim 1, in which said primary and secondary windings are spaced apart on said core; and at least one E-shaped magnetic yoke embracing said windings and having a middle limb, constituting said yoke member, projecting between the windings and having its ends spaced from said core to form an air gap therewith.

3. A constant potential transformer, as claimed in claim 1, in which said core comprises two U-shaped sectional strip core halves; said yoke member comprising two sectional strip core halves embracing said secondary winding and having their end surfaces spaced apart to form air gaps.

4. A constant potential transformer, as claimed in claim 1, in which said core comprises U-shaped sectional strip core halves; said yoke member comprising a U-shaped core portion partially spanning both of primary and secondary windings and having end surfaces adjacent the respective web portions of said U-shaped sectional strip core halves and spaced therefrom to form air gaps.

5. A constant potential transformer comprising, in combination, a core; a primary winding on said core and having a pair of A.C. input terminals; a secondary winding on said core; a condenser connected across said secondary winding to form therewith a parallel resonance circuit; a magnetic yoke member bridging said core between said primary and secondary windings and forming a stray flux path having a magnetic resistance greater than that of said core; said core and said yoke member comprising sheet metal laminations with magnetic preferential direction; the laminations forming said core being traversed by the magnetic flux in the magnetic preferential direction; the laminations forming said yoke member being traversed by the magnetic stray flux in a direction differing from the magnetic preferential direction; said yoke member comprising at least one bundle of laminations whose preferential magnetic direction extends at right angles to the longitudinal direction of said yoke member; said core comprising cut strip core halves carrying said primary and secondary windings and having end faces abutting respective opposite longer edges of the laminations of said bundle.

6. A constant potential transformer, as claimed in claim 5, in which two cut strip core halves, with a common bundle of laminations forming the leakage paths, are provided for each of the transformer primary winding and the transformer secondary winding.

7. A constant potential transformer, as claimed in claim 5, in which two cut strip core halves, with separate bundles of laminations forming the leakage paths, are provided for each of the transformer primary winding and the transformer secondary winding.

References Cited

UNITED STATES PATENTS

| 2,143,745 | 1/1939 | Sola | 323—60 |
| 2,771,587 | 11/1956 | Henderson | 336—160 |
| 2,996,656 | 8/1961 | Sola | 336—165 |
| 3,112,439 | 11/1963 | Rosin | 336—165 X |
| 3,289,280 | 12/1966 | Jones | 336—160 X |
| 3,319,205 | 5/1967 | Walz et al. | 336—165 |

JOHN F. COUCH, *Primary Examiner.*

G. GOLDBERG, *Assistant Examiner.*

U.S. Cl. X.R.

323—81; 336—160, 218